US011972649B2

(12) United States Patent
Ellis et al.

(10) Patent No.: US 11,972,649 B2
(45) Date of Patent: *Apr. 30, 2024

(54) SYSTEM AND METHOD FOR COMMUNICATING WITH A VEHICLE

(71) Applicant: DENSO CORPORATION, Kariya (JP)

(72) Inventors: J. Michael Ellis, Holland, MI (US); Eric Smith, Holland, MI (US); Aaron Day, Coopersville, MI (US); Kurt Dykema, Holland, MI (US); Warren E. Guthrie, West Olive, MI (US); Brent Bouws, Holland, MI (US); David L Klamer, Zeeland, MI (US); Kent D. Pilcher, Holland, MI (US)

(73) Assignee: DENSO CORPORATION, Kariya (JP)

( * ) Notice: Subject to any disclaimer, the term of this patent is extended or adjusted under 35 U.S.C. 154(b) by 114 days.

This patent is subject to a terminal disclaimer.

(21) Appl. No.: 17/397,333

(22) Filed: Aug. 9, 2021

(65) Prior Publication Data

US 2021/0366215 A1 Nov. 25, 2021

Related U.S. Application Data

(63) Continuation of application No. 16/562,604, filed on Sep. 6, 2019, now Pat. No. 11,094,151, which is a (Continued)

(51) Int. Cl.
*G07C 9/00* (2020.01)

(52) U.S. Cl.
CPC .................... *G07C 9/00309* (2013.01); *G07C 2009/00365* (2013.01); *G07C 2009/00507* (2013.01);
(Continued)

(58) Field of Classification Search
CPC ...... G07C 9/00309; G07C 2009/00365; G07C 2009/00507; G07C 2009/00769; G07C 2209/63
See application file for complete search history.

(56) References Cited

U.S. PATENT DOCUMENTS 4,942,393 A 7/1990 Waraksa et al.
5,075,632 A 12/1991 Payne et al.
(Continued)

OTHER PUBLICATIONS

Dahlgren, Erik et al., "Evaluation of indoor positioning based on Bluetooth Smart technology", Chalmers University of Technology, Department of Computer Science and Engineering, Jun. 10, 2014, pp. 1-94.
(Continued)

*Primary Examiner* — Quan Zhen Wang
*Assistant Examiner* — Son M Tang
(74) *Attorney, Agent, or Firm* — Warner Norcross + Judd LLP

(57) ABSTRACT

A system and method for using a portable device to communicate with a vehicle to authorize one or more vehicle operations. The portable device may authorize the vehicle to unlock/lock doors, start the vehicle engine, or mobilize the vehicle, or a combination thereof. The vehicle may include a vehicle transmitter system with one or more transmitters disposed at various locations on the vehicle, and the portable device may be configured to monitor a communication strength between the portable device and the one or more transmitters of the transmitter system. Based on the monitored signal strength, the portable device may determine location information about itself.

20 Claims, 3 Drawing Sheets

Related U.S. Application Data continuation of application No. 15/496,069, filed on Apr. 25, 2017, now Pat. No. 10,410,447, which is a continuation of application No. 14/620,959, filed on Feb. 12, 2015, now Pat. No. 9,666,005.

(60) Provisional application No. 61/940,128, filed on Feb. 14, 2014.

(52) U.S. Cl.
CPC .............. *G07C 2009/00769* (2013.01); *G07C 2209/63* (2013.01)

(56) References Cited

U.S. PATENT DOCUMENTS 6,069,411 A 5/2000 Charron
6,211,776 B1 4/2001 Röhrl et al.
6,218,932 B1 4/2001 Stippler
6,259,168 B1 7/2001 Okada
6,437,683 B1 8/2002 Wolf et al.
6,522,027 B1 2/2003 Morillon et al.
6,556,135 B2 4/2003 Attring et al.
6,697,024 B2 2/2004 Fuerst et al.
6,906,612 B2 6/2005 Ghabra et al.
6,965,295 B2 11/2005 Shimonomoto et al.
6,980,124 B2 12/2005 Kong et al.
7,046,119 B2 5/2006 Ghabra et al.
7,089,035 B2 8/2006 Ando et al.
7,106,171 B1 9/2006 Burgess
7,170,998 B2 1/2007 McLintock et al.
7,224,980 B2 5/2007 Hara
7,228,122 B2 6/2007 Oyagi et al.
7,277,007 B2 10/2007 John et al.
7,280,097 B2 10/2007 Chen et al.
7,321,814 B2 1/2008 Kanda et al.
7,333,021 B2 2/2008 Ieda et al.
7,336,151 B2 2/2008 Ueda et al.
7,394,349 B2 7/2008 Marek et al.
7,400,243 B2 * 7/2008 Sumida .............. G07C 9/00309 340/572.1
7,446,644 B2 11/2008 Schaffzin et al.
7,530,113 B2 5/2009 Braun
7,548,491 B2 6/2009 Macfarlane
7,629,873 B2 12/2009 Ghabra et al.
7,663,502 B2 2/2010 Breed
7,710,245 B2 5/2010 Pickering
7,751,957 B2 7/2010 Nagaoka et al.
7,768,377 B2 8/2010 Brey
7,805,169 B2 9/2010 Hicks, III
7,850,078 B2 12/2010 Christenson et al.
7,868,745 B2 * 1/2011 Schmidt ............. G07C 9/00309 340/5.61
7,904,219 B1 3/2011 Lowrey et al.
7,911,358 B2 3/2011 Bos et al.
7,912,625 B2 3/2011 Cahoon
7,916,021 B2 3/2011 Lickfelt et al.
7,932,892 B2 4/2011 Chen et al.
7,944,340 B1 * 5/2011 Ghabra .................. G08C 17/02 307/10.1
7,961,076 B2 6/2011 Kelley et al.
7,999,655 B2 8/2011 Yoshikawa
8,022,808 B2 9/2011 Kurpinski et al.
8,048,174 B2 11/2011 Yamamichi et al.
8,050,817 B2 11/2011 Moinzadeh et al.
8,053,922 B2 * 11/2011 Muller .................... B60R 25/24 455/556.1
8,077,011 B2 12/2011 McBride et al.
8,089,339 B2 1/2012 Mikan et al.
8,089,342 B2 * 1/2012 Sugiura ................... B60R 25/24 340/426.36
8,098,130 B2 1/2012 Baruco et al.
8,102,239 B2 1/2012 Woo
8,115,609 B2 2/2012 Ketari
8,126,400 B2 2/2012 Jung et al.
8,126,450 B2 2/2012 Howarter et al.
8,127,984 B2 3/2012 Zatloukal et al.
8,159,324 B2 4/2012 Zellweger et al.
8,175,657 B2 5/2012 Okayasu
8,193,903 B2 6/2012 Kraimer et al.
8,224,313 B2 7/2012 Howarter et al.
8,245,052 B2 8/2012 Bjorn
8,248,968 B2 8/2012 Handforth et al.
8,284,022 B2 10/2012 Kachouh
8,299,895 B2 10/2012 Harris
8,319,605 B2 11/2012 Hassan et al.
8,334,758 B2 12/2012 Baruco et al.
8,358,197 B2 1/2013 Tran
8,421,589 B2 4/2013 Sultan et al.
8,427,289 B2 4/2013 Ghabra et al.
8,432,260 B2 4/2013 Talty et al.
8,437,886 B1 5/2013 Yang
8,437,916 B2 5/2013 Fawaz et al.
8,482,382 B2 7/2013 Lickfelt et al.
8,494,447 B2 7/2013 Oesterling et al.
8,527,015 B2 9/2013 Alrabady et al.
8,610,674 B2 12/2013 Pryor
8,706,143 B1 4/2014 Elias
8,744,482 B2 6/2014 Margalef et al.
8,868,254 B2 10/2014 Louboutin
8,947,202 B2 2/2015 Tucker et al.
9,047,716 B1 * 6/2015 Ghabra .............. G07C 9/00309
9,126,564 B2 * 9/2015 Ono ........................ B60R 25/24
9,189,900 B1 * 11/2015 Penilla .................... B60L 53/80
9,241,235 B2 * 1/2016 Santavicca ......... G07C 9/00309
9,262,878 B1 * 2/2016 Ghabra ................... H04L 69/18
9,478,848 B2 10/2016 Nagata
9,536,364 B2 1/2017 Talty et al.
9,666,005 B2 5/2017 Ellis et al.
10,410,447 B2 9/2019 Ellis et al.
11,094,151 B2 8/2021 Ellis et al.
2001/0054952 A1 12/2001 Desai et al.
2002/0140545 A1 10/2002 Nietupski et al.
2002/0186144 A1 12/2002 Meunier
2003/0095040 A1 5/2003 Shimomura
2003/0117923 A1 6/2003 Tang et al.
2003/0135321 A1 7/2003 Kumazaki et al.
2003/0139878 A1 * 7/2003 DeLuca ................. G01C 21/26 342/357.75
2004/0066092 A1 * 4/2004 Muller .................... B60R 25/24 307/10.1
2004/0201277 A1 10/2004 Hentsch et al.
2004/0257209 A1 12/2004 Yang
2005/0038574 A1 2/2005 Gila et al.
2005/0046554 A1 3/2005 Attaprasith
2005/0054450 A1 * 3/2005 Yamaguchi ............ A63H 30/04 463/58
2005/0099263 A1 5/2005 Ikeda
2005/0225429 A1 10/2005 Burzio
2005/0242923 A1 11/2005 Pearson et al.
2006/0061459 A1 3/2006 Kawamura et al.
2006/0114100 A1 * 6/2006 Ghabra .............. G07C 9/00309 340/5.72
2006/0125601 A1 6/2006 Onishi
2006/0135216 A1 6/2006 Collavo et al.
2006/0164207 A1 7/2006 Wilcox
2006/0238297 A1 10/2006 Tang et al.
2006/0290503 A1 * 12/2006 Sumida ................... B60R 25/24 340/572.1
2007/0109093 A1 5/2007 Matsubara et al.
2007/0138869 A1 6/2007 Otani et al.
2007/0142155 A1 6/2007 Schumacher
2007/0162191 A1 7/2007 Matsubara et al.
2007/0176739 A1 8/2007 Raheman
2007/0188301 A1 8/2007 Nakajima et al.
2007/0197261 A1 8/2007 Humbel
2007/0200672 A1 * 8/2007 McBride ............... B60R 25/245 340/5.72
2007/0268110 A1 11/2007 Little
2007/0281735 A1 12/2007 Suzuki
2008/0048909 A1 2/2008 Ioffe et al.
2008/0068128 A1 3/2008 Ghabra et al.
2008/0079602 A1 * 4/2008 King ....................... B60R 25/24 340/5.72

(56) References Cited

U.S. PATENT DOCUMENTS

| | | | | |
|---|---|---|---|---|
| 2008/0079603 | A1* | 4/2008 | King | B60R 25/24 340/5.72 |
| 2008/0088411 | A1 | 4/2008 | Ghabra et al. | |
| 2008/0136611 | A1 | 6/2008 | Benco et al. | |
| 2008/0143499 | A1 | 6/2008 | Shimomura | |
| 2008/0147268 | A1 | 6/2008 | Fuller | |
| 2008/0194291 | A1 | 8/2008 | Martin et al. | |
| 2008/0197970 | A1 | 8/2008 | Fouts | |
| 2008/0197987 | A1 | 8/2008 | King et al. | |
| 2008/0204281 | A1 | 8/2008 | Sugiura et al. | |
| 2008/0208405 | A1 | 8/2008 | Alrabady et al. | |
| 2008/0309453 | A1 | 12/2008 | Kim et al. | |
| 2009/0091423 | A1 | 4/2009 | Nagaoka et al. | |
| 2009/0115585 | A1 | 5/2009 | Minassian | |
| 2009/0146830 | A1 | 6/2009 | Ogiso | |
| 2009/0153295 | A1 | 6/2009 | Hamada | |
| 2009/0156126 | A1 | 6/2009 | Willis | |
| 2009/0167524 | A1 | 7/2009 | Chesnutt et al. | |
| 2009/0195370 | A1 | 8/2009 | Huffman et al. | |
| 2009/0212905 | A1 | 8/2009 | Batz et al. | |
| 2009/0289759 | A1 | 11/2009 | Tsuchiya et al. | |
| 2009/0289780 | A1 | 11/2009 | Tenorio-Fox | |
| 2009/0291637 | A1 | 11/2009 | Alrabady et al. | |
| 2009/0328189 | A1 | 12/2009 | Budyta et al. | |
| 2010/0017118 | A1 | 1/2010 | Doughtery | |
| 2010/0063670 | A1 | 3/2010 | Brzezinski et al. | |
| 2010/0087137 | A1 | 4/2010 | Fischer et al. | |
| 2010/0097178 | A1* | 4/2010 | Pisz | G07C 9/28 340/5.72 |
| 2010/0102924 | A1 | 4/2010 | King et al. | |
| 2010/0109914 | A1 | 5/2010 | Tieman et al. | |
| 2010/0136944 | A1 | 6/2010 | Taylor et al. | |
| 2010/0191392 | A1* | 7/2010 | Juzswik | B60R 25/245 701/2 |
| 2010/0217457 | A1* | 8/2010 | Georgi | G07C 9/00309 701/2 |
| 2010/0222940 | A1 | 9/2010 | Pütsch | |
| 2010/0231351 | A1* | 9/2010 | Lickfelt | B60R 25/24 340/5.6 |
| 2010/0265034 | A1 | 10/2010 | Cap et al. | |
| 2010/0304690 | A1* | 12/2010 | Proefke | B60R 25/24 340/5.2 |
| 2010/0305779 | A1 | 12/2010 | Hassan et al. | |
| 2011/0040424 | A1 | 2/2011 | Lickfelt et al. | |
| 2011/0045842 | A1 | 2/2011 | Rork et al. | |
| 2011/0060480 | A1 | 3/2011 | Mottla et al. | |
| 2011/0086668 | A1 | 4/2011 | Patel | |
| 2011/0112969 | A1 | 5/2011 | Zaid et al. | |
| 2011/0165896 | A1 | 7/2011 | Stromberg et al. | |
| 2011/0169604 | A1 | 7/2011 | Ghabra et al. | |
| 2011/0215901 | A1 | 9/2011 | Van Wiemeersch et al. | |
| 2011/0275321 | A1 | 11/2011 | Zhou et al. | |
| 2011/0309922 | A1 | 12/2011 | Ghabara et al. | |
| 2012/0028580 | A1* | 2/2012 | Oesterling | H04B 1/3822 455/41.2 |
| 2012/0040665 | A1 | 2/2012 | Liu et al. | |
| 2012/0092129 | A1* | 4/2012 | Lickfelt | B60R 25/24 340/5.72 |
| 2012/0105197 | A1 | 5/2012 | Kobres | |
| 2012/0126943 | A1 | 5/2012 | Biondo et al. | |
| 2012/0129493 | A1 | 5/2012 | Vasudevan | |
| 2012/0164989 | A1 | 6/2012 | Xiao et al. | |
| 2012/0208519 | A1 | 8/2012 | Seaver | |
| 2012/0229253 | A1 | 9/2012 | Kolar | |
| 2012/0268259 | A1 | 10/2012 | Igel et al. | |
| 2012/0282913 | A1 | 11/2012 | Kaindl et al. | |
| 2012/0309314 | A1 | 12/2012 | Chen et al. | |
| 2012/0310446 | A1 | 12/2012 | Murphy | |
| 2012/0313768 | A1 | 12/2012 | Campbell et al. | |
| 2012/0313796 | A1* | 12/2012 | Lee | B60Q 1/52 701/2 |
| 2012/0329445 | A1 | 12/2012 | Elliott | |
| 2013/0015814 | A1 | 1/2013 | Kelly et al. | |
| 2013/0033381 | A1 | 2/2013 | Breed | |
| 2013/0082820 | A1 | 4/2013 | Tieman | |
| 2013/0099892 | A1 | 4/2013 | Tucker et al. | |
| 2013/0103200 | A1 | 4/2013 | Tucker et al. | |
| 2013/0106602 | A1* | 5/2013 | Lickfelt | B60R 25/24 340/539.11 |
| 2013/0109342 | A1 | 5/2013 | Welch | |
| 2013/0130674 | A1 | 5/2013 | De Wind et al. | |
| 2013/0141212 | A1 | 6/2013 | Pickering | |
| 2013/0154819 | A1 | 6/2013 | Stefanovski et al. | |
| 2013/0194068 | A1 | 8/2013 | Mönig et al. | |
| 2013/0211623 | A1 | 8/2013 | Thompson et al. | |
| 2013/0237189 | A1 | 9/2013 | Nishidal | |
| 2013/0257604 | A1 | 10/2013 | Mirle et al. | |
| 2013/0259232 | A1 | 10/2013 | Petel | |
| 2013/0271273 | A1* | 10/2013 | Oesterling | G07C 9/00309 340/426.18 |
| 2013/0332007 | A1* | 12/2013 | Louboutin | H04M 1/724098 701/1 |
| 2014/0025950 | A1* | 1/2014 | Peeters | H04L 9/14 713/168 |
| 2014/0040575 | A1* | 2/2014 | Horn | G06F 16/28 711/E12.103 |
| 2014/0169564 | A1 | 6/2014 | Gautama et al. | |
| 2014/0188309 | A1 | 7/2014 | Caratto et al. | |
| 2014/0188348 | A1 | 7/2014 | Gautama et al. | |
| 2014/0274013 | A1* | 9/2014 | Santavicca | G07C 9/00309 455/418 |
| 2014/0308971 | A1 | 10/2014 | O'Brien et al. | |
| 2015/0050923 | A1 | 2/2015 | Tu et al. | |
| 2015/0105944 | A1 | 4/2015 | Louboutin | |
| 2015/0141043 | A1 | 5/2015 | Abramson et al. | |
| 2015/0145646 | A1 | 5/2015 | Seino | |
| 2015/0147974 | A1 | 5/2015 | Tucker | |
| 2015/0149042 | A1 | 5/2015 | Cooper et al. | |
| 2015/0171510 | A1 | 6/2015 | Hirose | |
| 2015/0235486 | A1 | 8/2015 | Ellis et al. | |
| 2015/0287257 | A1* | 10/2015 | Thompson | G07C 9/00896 340/5.72 |
| 2016/0133072 | A1* | 5/2016 | Santavicca | G07C 9/00309 340/5.61 |
| 2016/0225260 | A1 | 8/2016 | Lin | |
| 2017/0228952 | A1 | 8/2017 | Ellis et al. | |
| 2018/0302859 | A1* | 10/2018 | Elangovan | B60R 25/24 |
| 2019/0051072 | A1 | 2/2019 | Okada | |
| 2019/0196463 | A1 | 6/2019 | Glavinic et al. | |
| 2019/0385393 | A1* | 12/2019 | Bianchi | H04W 52/0245 |

OTHER PUBLICATIONS

Faragher, R. et al., "An Analysis of the Accuracy of Bluetooth Low Energy for Indoor Positioning Applications", Proceedings of the 27th International Technical Meeting of The Satellite Division of the Institute of Navigation (ION GNSS+ 2014), Tampa, Florida, Sep. 2014, pp. 201-210.

Faragher, R., et al., "Location Fingerprinting With Bluetooth Low Energy Beacons", IEEE Journal on Selected Areas in Communications, vol. 33, No. 11 Nov. 2015, pp. 2418-2428.

Hereman, Willy et al., "Determination of a Position in Three Dimensions Using Trilateration and Approximate Distances", Department of Mathematical and Computer Sciences, Colorado School of Mines, Sep. 17, 1995, submitted to Decision Sciences, Oct. 1995, pp. 1-22.

Ryan, Mike, "Bluetooth: With Low Energy comes Low Security", iSEC Partners, presented at Proceedings of the 7th USENIX conference on Offensive Technologies, Aug. 13, 2013, pp. 1-7.

Halder, S.J. et al., "Advanced Smoothing Approach of RSSI and LQI for Indoor Localization System", International Journal of Distributed Sensor Networks, received Jul. 25, 2014; accepted Nov. 3, 2014, pp. 1-13.

Lindh, J., "Bluetooth Low Energy Beacons", Texas Instruments Corporation Application Report, Jan. 2015, pp. 1-13.

"Real-time locating system", available at https://en.wikipedia.org/wiki/Real-time_locating_system as of Feb. 6, 2014.

http://www.onyxbeacon.com/ available as of Jun. 25, 2014.

http://developer.estimote.com/ available as of Aug. 13, 2015.

(56) References Cited

OTHER PUBLICATIONS https://getpixie.com available as of Aug. 23, 2014.
http://www.slideshare.net/localzco/whats-bestmicrolocationtechnologyibeaconblenfcqrgps available as of Apr. 5, 2014.

* cited by examiner

SYSTEM AND METHOD FOR COMMUNICATING WITH A VEHICLE

FIELD OF INVENTION

The present invention relates to authorizing vehicle operations, and more particularly to a portable device configured to authorize one or more vehicle operations.

BACKGROUND OF THE INVENTION

Keyless entry systems for vehicles have become nearly ubiquitous in the automotive realm. In a conventional keyless entry system, a user carries a keyfob having a button that enables the user to initiate a vehicle operation, such as starting the vehicle or mobilizing the vehicle. In response to user activation of the button, the keyfob communicates instructions to the vehicle to initiate the vehicle operation. In one conventional configuration, the vehicle may include a series of RF antennas that allow the vehicle to determine whether the keyfob is present within the vehicle. Because the keyfob in these conventional configurations is carried by the user and serves a singular purpose—operation in conjunction with a keyless entry system—the keyfob is configured to be a simplistic device having limited capabilities. More advanced operations and processing may be performed by the vehicle, rather than the keyfob, so that cost and size of the keyfob may be kept down.

One exemplary operation performed by a conventional keyless entry system is detection inside the vehicle. In keyless entry systems configured to allow mobilization of a vehicle, detection inside the vehicle is often times a concern because there are several scenarios where the driver and the keyfob may be outside the vehicle, but in general proximity thereto. For example, while the driver is refueling the vehicle at a service station, if the vehicle were to be mobilized, a thief, or a young child, may climb into the driver's seat and attempt to drive the vehicle without permission. For at least this reason, conventional keyfob-based vehicle entry systems, in some cases, have utilized a series of RF antennas in the vehicle, so that the vehicle, itself may detect the presence of the keyfob in the vehicle or inside the vehicle cabin, and prevent mobilization, unless the vehicle detects that the keyfob is located in the vehicle.

Portable devices, such as smartphones, as well as smartphone applications (or programs running on the portable devices), have also become nearly ubiquitous. In recent times, there has been some interest in utilizing these portable devices to instruct a vehicle to perform an operation. However, unlike the conventional keyfob, smartphones in use today often times are not specifically configured to communicate with a keyless entry system. Not every smartphone is used in conjunction with a vehicle, so smartphone manufacturers are reluctant to incorporate a keyfob antenna and communication interface into the smartphone, avoiding or reducing unnecessary cost.

For at least these reasons, conventional smartphone applications in the context of vehicle control utilize communication interfaces already present in the device and the vehicle, including, for example, cellular, GPS, and Bluetooth interfaces. These conventional systems, however, are not without downsides. The vehicle, smartphone, and cellular, GPS, or Bluetooth interfaces in the conventional system are not configured to detect presence or location of the smartphone relative to the vehicle, such as presence inside the vehicle. As a result, actual mobilization via the smartphone is not realized.

SUMMARY OF THE INVENTION

In accordance with one embodiment, a portable device may be configured to communicate with a vehicle to authorize one or more vehicle operations. For example, the portable device may authorize the vehicle to unlock/lock doors, start the vehicle engine, mobilize the vehicle, or a combination thereof. The vehicle may include a vehicle transmitter system with one or more transmitters disposed at various locations on the vehicle, and the portable device may be configured to monitor a communication strength between the portable device and the one or more transmitters of the transmitter system. Based on the monitored signal strength, the portable device may determine location information about itself relative to the vehicle. For example, based on a monitored strength of communication from each of the one or more transmitters of the vehicle transmitter system, the portable device may determine that the portable device is proximate to but not within the vehicle, or that the portable device is inside the vehicle. As another example, based on the monitored strength of communication, the portable device may determine whether the portable device is located inside the vehicle and in proximity to a vehicle driver seat.

In another embodiment, based on the location information determined by the portable device about itself, the portable device may communicate an authorization code to the vehicle to authorize a vehicle operation. For example, if the portable device determines the portable device is in proximity to but not within the vehicle, the portable device may communicate an authorization code to unlock one or more doors of the vehicle. As another example, if the portable device determines the portable device is located in an area proximate to the vehicle driver seat, the portable device may communicate an authorization code to allow mobilization of the vehicle.

In still another embodiment, the portable device, based on the determined location information, may communicate information in addition to or alternative to the authorization code. For example, the portable device may communicate the location information about itself relative to the vehicle, or may communicate an instruction to perform a vehicle operation, or both.

In yet another embodiment, the vehicle transmitter system may include a plurality of Bluetooth Low Energy (Bluetooth LE) transmitters, and the portable device may monitor the signal strength of these Bluetooth LE transmitters. In particular, the portable device may use the signal strength of each of the Bluetooth LE transmitters as a basis for determining location information about itself relative to the vehicle. For example, based on the relative strength of each Bluetooth LE transmitter from among multiple transmitters disposed at various positions on the vehicle, the portable device may determine that it is present inside the vehicle and located in proximity to the vehicle driver seat. Based on such a determination, the portable device may communicate an authorization code to allow mobilization of the vehicle.

In even another embodiment, the one or more transmitters of the vehicle transmitter system may include a master device and one or more remote beacon devices disposed at various positions on the vehicle. For example, a remote beacon device may be disposed in the door of the vehicle, and the master device may be disposed in the vehicle dash.

The master device and the remote beacon devices may be Bluetooth LE capable devices.

In a further embodiment, the master device of the vehicle transmitter system may be operably connected to a vehicle bus of the vehicle, and may be capable of sending messages along the vehicle bus to initiate one or more vehicle operations, such as an instruction to lock/unlock a vehicle door and to enable mobilization of the vehicle. The master device also may control operation of the remote beacon devices, including, for example, waking the remote beacon devices in response to detecting that a portable device is in range. As another example, the master device may wake the remote beacon devices in response to detecting motion of the vehicle door. In yet another example, the remote beacon devices may be motion sensitive, and may be configured to wake themselves in response to detecting motion.

In still a further embodiment, a method of authorizing a vehicle to perform a vehicle operation is provided. The method may include determining, in a portable device, location information about the portable device relative to the vehicle. Based on the location information, the portable device may communicate an authorization code to the vehicle, enabling the vehicle to perform a vehicle operation. In addition to or alternative to the authorization code, the portable device may communicate location information or an instruction to perform a vehicle operation, or both. Optionally, the portable device may monitor signal strength of a plurality of transmitters disposed on the vehicle, and use monitored signal strength as a basis for determining location information about the portable device relative to the vehicle.

In even a further embodiment, systems and methods utilize a portable device, such as a smart phone, to replace a conventional keyless entry system. The keyfob present in many conventional keyless entry systems may be eliminated by configuring a vehicle to include a vehicle transmitter system, and enabling the portable device, carried by many users in recent times, to authorize or initiate, or both, vehicle operations of the vehicle based on communication with the vehicle transmitter system. In this way, users may be freed from carrying or using a separate keyfob to access their vehicle.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method in accordance with one embodiment includes using a portable device to communicate with a vehicle to authorize one or more vehicle operations. For example, the portable device may authorize the vehicle to unlock/lock doors, start the vehicle engine, or authorize mobilization of the vehicle, or a combination thereof. The vehicle may include a vehicle transmitter system with one or more transmitters disposed at various locations on the vehicle, and the portable device may be configured to monitor a communication strength between the portable device and the one or more transmitters of the vehicle transmitter system. Based on the monitored signal strength, the portable device may determine location information about itself.

Figure 1:
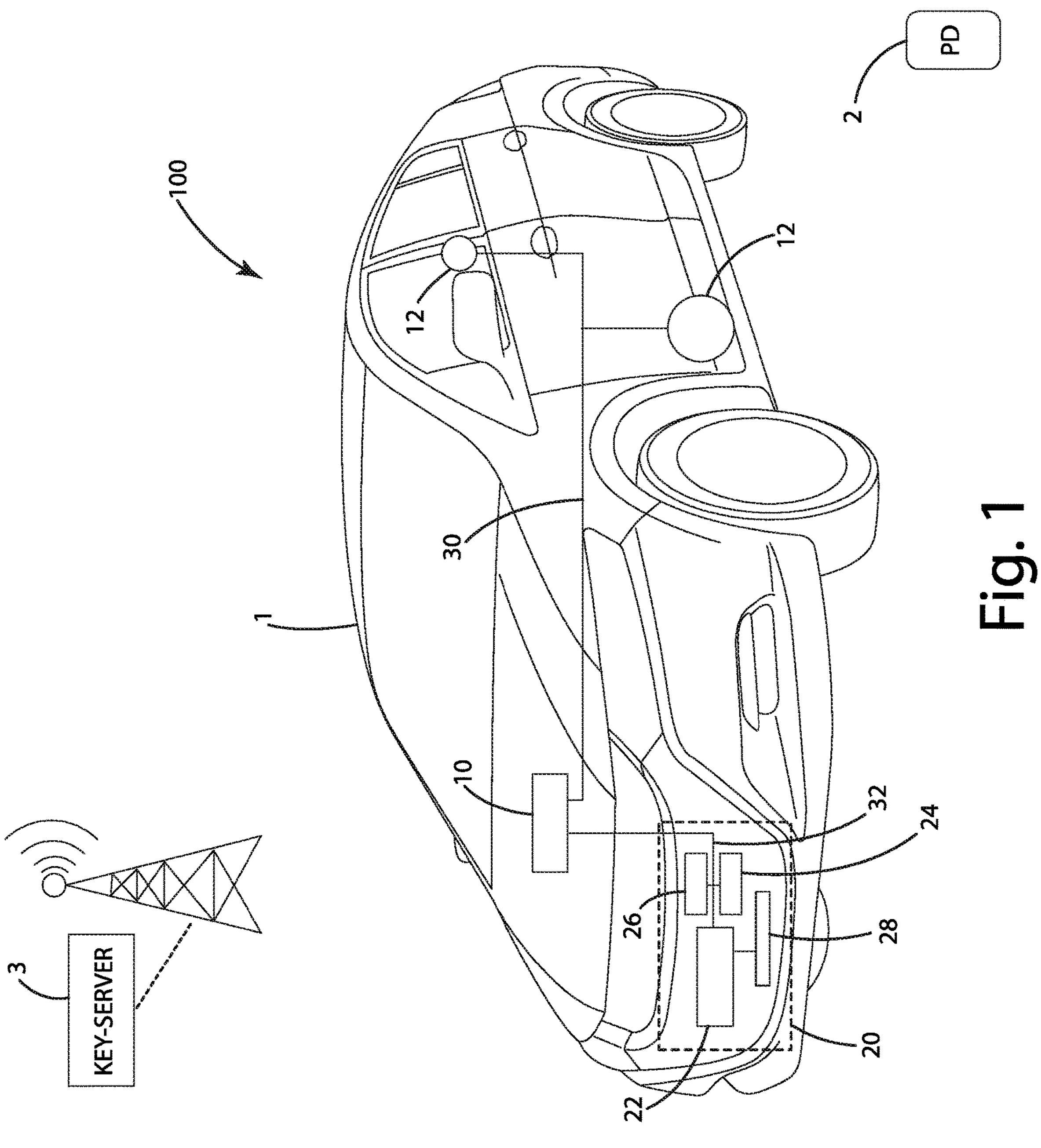
FIG. 1 is a representative view of a vehicle, a portable device, and an authorization server according to one embodiment.
Figure 2:
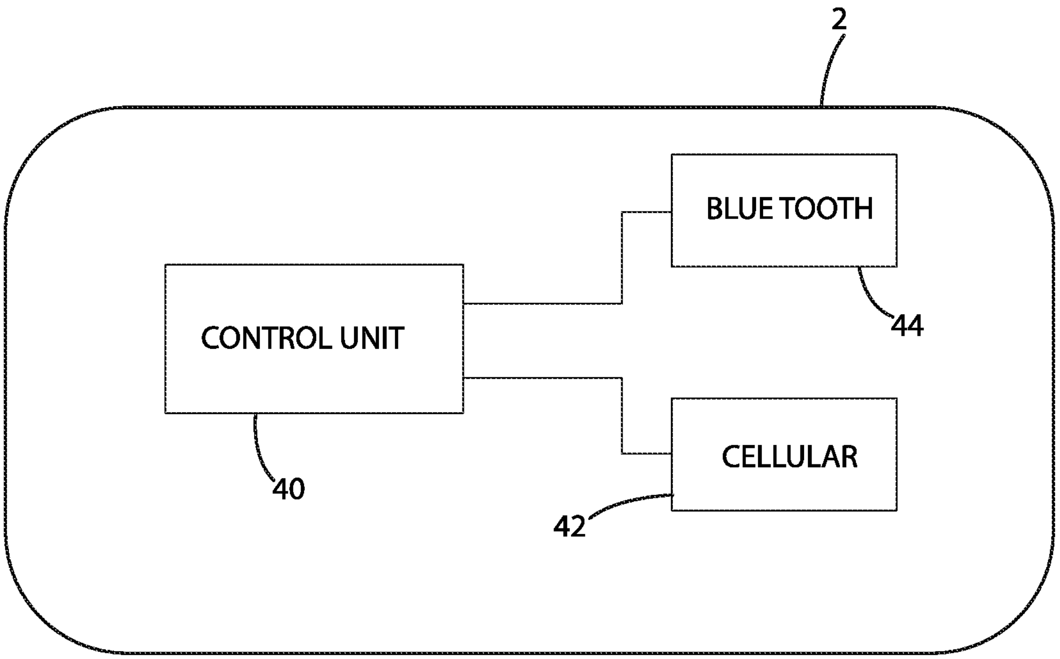
FIG. 2 is a portable device according to one embodiment.

A vehicle control system, according to one embodiment, is shown in FIGS. 1-2, and generally designated 100. As depicted, the vehicle control system 100 includes a vehicle 1 and a portable device 2. The portable device 2 may be a smartphone capable of running one or more smartphone applications, and being carried by a user. The portable device 2 may include a control unit 40 and one or more transceivers capable of wireless communication, including, for example, a Bluetooth LE transceiver 44 and a cellular transceiver 42. The components associated with principal operation of the portable device 2 (and not associated with the vehicle control system) are generally conventional, and therefore will not be described in detail. For example, in the context of a smartphone, no effort is made to describe the electronic components associated with the smart phone itself, such as the user interface and the display. It should be understood that the portable device 2 is not limited to a smartphone, and that the portable device 2 may be any type of device carried by a user and separable from a vehicle, including, for example, a key fob.

The vehicle 1 in the illustrated embodiment of FIG. 1 may include a vehicle system 20 having an engine control module 22, a doorlock control module 24, an engine ignition system 26, and a vehicle bus 32. The engine control module 22 may form a central processor of the vehicle, and may coordinate control over vehicle operations and systems of the vehicle. The vehicle bus 32 may provide a communication interface through which components of the vehicle may communicate. For example, the engine control module 22 may communicate with various components of the vehicle through the vehicle bus 32, which, in one configuration, is a wired CAN bus (controller area network bus). The doorlock control module 24 may control operation of the door locks, including, for instance, separate control over locking/unlocking of the driver side and passenger-side door locks. The engine ignition system 26 may be in operable communication with the engine starter and fuel systems to enable ignition of the vehicle engine. Similar to portable device 2, components associated with principal operation of the vehicle 1 (and not associated with the vehicle control system) are generally conventional, and therefore will not be described in detail. For example, no effort is made to describe in detail conventional components of the vehicle 1, such as the engine starter, fuel systems, and the traction control system. Additionally, although shown as separate systems or components, it should be understood that one or more of the engine control module 22, the doorlock control module 24, and the engine ignition system 26 may be distributed control systems in various components of the vehicle or may be integrated into one device or component of the vehicle.

In the illustrated embodiment of FIG. 1, the vehicle 1 may also include a plurality of transmitters 10, 12 capable of transmitting signals to one or more transceivers of the portable device 2. For example, the plurality of transmitters 10, 12 may be Bluetooth LE capable transmitters configured to transmit signals to the Bluetooth LE transceiver 44 of the portable device 2. As described herein, based on the communication signal from one or more of the plurality of transmitters 10, 12, the portable device 2 may determine location information about itself. For purposes of disclosure, the transmitters 10, 12 are described in connection with a Bluetooth LE system, but it should be understood that any type of communication technology or framework may be utilized, including, for example, standard Bluetooth technology. Additionally, one or more of the transmitters 10, 12 may be transceivers capable of transmitting and receiving communication.

The plurality of transmitters 10, 12 in the illustrated embodiment of FIG. 1 includes a master transmitter 10 and one or more beacon transmitter devices 12. The master transmitter 10 may direct operation of or communicate with the beacon transmitter devices 10 via a vehicle transmitter communication interface 30, which may be a wired or wireless interface. For purposes of disclosure, the transmitter communication interface 30 is shown separate from the vehicle bus 32, but it should be understood that the transmitter communication interface 30 and the vehicle bus 32 may be a shared bus, such as a CAN bus. The master transmitter 10 may also communicate with the vehicle system 20 via the vehicle bus 32 to authorize or initiate, or both, one or more vehicle operations. For example, the master transmitter 10 may instruct, based on communication from the portable device 2, the vehicle system 20 to lock or unlock a door of the vehicle.

The one or more beacon transmitter devices 12 may be disposed at various locations on the vehicle, potentially known to the portable device 2, enabling the portable device 2 to determine location information about itself based on a communication signal strength. Example locations include a vehicle dash, a rearview exterior mirror, and a lower portion of the driver side door, or a combination thereof. In the illustrated embodiment of FIG. 1, the master transmitter 10 is disposed in the vehicle dash, and two beacon transmitter devices 12 are disposed respectively in the lower portion of the driver side door (proximate to a floor of the vehicle) and the rearview exterior mirror. It should be understood, however, that embodiments described herein are not limited to this configuration, and that the master transmitter 10 and the one or more beacon transmitter devices 12 may be disposed anywhere on the vehicle 2.

In one embodiment, the master transmitter 10 may be a Bluetooth LE device, powered by the vehicle system 20, and including an omnidirectional antenna for communicating with the Bluetooth LE transceiver 44 of the portable device 2. With this configuration, the master transmitter 10 may establish a Bluetooth LE connection between itself and the portable device 2, allowing the portable device 2 to communicate with the master transmitter 10 when in proximity to the vehicle 1.

The one or more beacon transmitter devices 12 may be disposed on the vehicle at locations separate from the master transmitter 10, and may be battery powered such that may operate without vehicle power. Alternatively, or additionally, the beacon transmitter devices 12 may receive power from the vehicle. In the illustrated embodiment, the beacon transmitter devices 12 include directional antennas that facilitate determining location information about the portable device. For example, a beacon transmitter device 12 positioned in the driver side door may include a directional antenna aimed toward the driver side seat such that, if the portable device 2 is currently located outside the vehicle, or in a rear seat of the vehicle, the signal strength between the beacon transmitter device 12 in the driver side door and the portable device 2 may be low relative to the signal strength between the portable device 2 and the master transmitter 10 or another beacon transmitter device 12, or both. Based on the signal strength of communication from at least one of the master transmitter 10 and the one or more beacon transmitter devices 12, the portable device 2 may determine location information about itself, such as whether the portable device is in proximity to the driver-side seat.

In one embodiment, a beacon transmitter device 12 disposed on the exterior of the vehicle 1, such as a rearview exterior mirror or a vehicle door handle, may include a user input that enables a user to enter information to unlock the vehicle 1. For example, the user input may be one or more buttons that allow entry of a code to unlock the vehicle. If the user is not carrying the portable device 2, or if the portable device 2 is non-operational (e.g., the battery of the portable device is drained), the user input may provide an alternative way to gain entry to the vehicle 1.

The one or more beacon transmitter devices 12 in the illustrated embodiment of FIG. 1 may be configured to conserve power by entering a sleep mode in which the one or more beacon transmitter devices 12 do not emit a signal to the portable device 2. The one or more beacon transmitter devices 12 may wake-up in response to one or more conditions. For example, the one or more beacon transmitter devices 12 may be motion activated such that motion of a vehicle door awakens a beacon transmitter device 12. As another example, the master transmitter 10 may be capable of waking the one or more beacon transmitter devices 12 in response to one or more conditions, such as detecting that a portable device 2, paired with the master transmitter 10, is in proximity to the master transmitter 10. In addition to or alternatively, the master transmitter 10 may wake the one or more beacon transmitter devices 12 in response to a user opening a vehicle door, such as the driver-side vehicle door. The master transmitter 10, as described herein, may be coupled to the vehicle bus 32, and may monitor the bus for communication, such as communication indicating a vehicle door has been opened, allowing the master transmitter 10 to control the one or more beacon transmitter devices 12 based on one or more conditions related to the vehicle. Each of the one or more beacon transmitter devices 12 may transmit a signal to the portable device 2, which, based on the strength of these signals, may determine location information about itself. For example, if the signal received from a beacon transmitter device 12 disposed within a cabin of the vehicle is weaker than the signal received from a beacon transmitter device 12 disposed external to the cabin, the portable device 2 may determine that the portable device 2 is located outside the vehicle, but in proximity thereto. In one embodiment, the master transmitter 10 may perform measurements on the signals transmitted from the one or more beacon transmitter devices 12, and, based on these measurements, may direct one or more of the beacon transmitter devices 12 to adjust a power level or gain of a signal being transmitted. In this way, the master transmitter 10 may calibrate the one or more beacon transmitter devices 12 to a configuration of the vehicle 1, potentially improving the ability of the portable device 2 to determine location information about itself based on the strength of the signals being transmitted from the one or more beacon transmitter devices 12. Additionally, or alternatively, the master transmitter 10 may direct the one or more beacon transmitter devices 12 to adjust the gain of a signal being transmitted based on environmental factors, such as temperature.

In one embodiment, each of the one or more beacon transmitter devices 12 may transmit a Bluetooth discovery signal, or a received signal strength indicator (RSSI) signal, or both, to the portable device 2 upon waking. The signal transmitted from each of the beacon transmitter devices 12 may be repeatedly transmitted at a rapid rate, so that the portable device 2 may use the RSSI signals to determine location information of the portable device 2 relative to the one or more remote beacons 12. The master transmitter 10 may direct the one or more beacon transmitter devices 12 to adjust the transmission rate based on one or more factors, such as whether a portable device 2 is connected to the master transmitter 10. For example, in response to a portable device 2 connecting to the master transmitter 10, the master transmitter 10 may direct the one or more beacon transmitter devices 12 to increase the transmission rate. If the portable device 2 provides a valid authorization code, and the portable device 2 is no longer determining location information about itself, the master transmitter 10 may direct the one or more beacon transmitter devices 12 to reduce the transmission rate, potentially conserving power. Additionally, or alternatively, the master transmitter 10 may direct the one or more beacon transmitter devices 12 to go to sleep.

As another example, the master transmitter 10 may direct one of the beacon transmitter devices 12 to increase the transmission rate while maintaining the transmission rate of another beacon transmitter device 12. Increased transmission rate from a beacon transmitter device 12 may further facilitate a location determination in the portable device 2. Accordingly, depending on the location information provided by the portable device 2, the master transmitter 10 may direct one beacon transmitter device 12 considered proximate to a location of the portable device 2 to increase its transmission rate, while a beacon transmitter device 12 considered farther away may be directed to maintain or reduce its transmission rate. In yet another example, a beacon transmitter device 12 disposed on an exterior mirror may transmit or advertise at a low rate until the portable device 2 is detected. After the portable device 2 is detected, a beacon transmitter device 12 disposed near an inside of the driver-side door may at least one of wake-up and increase its advertisement rate.

The control unit 40 of the portable device may monitor the signal strength (RSSI data) from each of the remote transmitter devices 12, and determine, based on the monitored signal strength, if the portable device 2 is located in close proximity to the vehicle 1 for unlocking or within the front part of the vehicle 1 for allowing mobilization of the vehicle 1. It should be understood that the portable device 2 may determine location information about itself in a variety of ways. For example, the control unit 40 of the portable device 2 may determine location information based on whether the signal strength from any one of the one or more remote beacons 12 exceeds a threshold. In other words, if the signal strength from one of the remote beacons 12 exceeds a threshold, or is within a range, the control unit 40 of the portable device 2 may determine the portable device 2 is in proximity to that remote beacon 12. In addition to, or alternatively, the control unit 40 may determine location information about the portable device 2 based on the relative signal strength from two or more remote beacons 12. As an example, if the signal strength from a first remote beacon 12 is above or below a first threshold, or within a first range, and the signal strength from a second remote beacon 12 is also above or below a second threshold, or within a second range, the control unit 40 of the portable device 2 may determine the portable device 2 is likely positioned in a particular location relative to the first and second remote beacons 12. As another example, the control unit 40 may determine location information based on a differences among the signal strengths of communication from the two or more remote beacons 12. A difference between the signal strength from the first remote beacon 12 and the signal strength of the second remote beacon 12 may be indicative of location information of the portable device 2 relative to the first and second remote beacons 12.

Accuracy in the determination of a location of the portable device 2 may depend on a variety of factors. For example, the potential accuracy may depend on the number of beacon transmitter devices 12, the positions of the beacon transmitter devices 12, whether a beacon transmitter device 12 includes a directional antenna or an omnidirectional antenna, and the transmission rate of the beacon transmitter device 12.

The thresholds or ranges, or both, utilized by the control unit 40 may be determined during or based on a calibration or setup process implemented by the portable device 2 in order to associate the portable device 2 with the vehicle 1, and to acclimate the portable device 2 to one or more characteristics of the vehicle 1. The physical construction of the vehicle 1 may differ between makes or models, or both. These differences may affect transmission of signals from the one or more transmitters 10, 12. Calibration during the setup process may enable the portable device 2 to tailor the process for determining location information relative to the vehicle 1 in order to reduce the impact of construction differences among vehicles. Calibration may also include adjusting the transmission level of the remote beacon devices. For example, the master device 10 may direct one or more of the remote beacon devices to increase or reduce the transmission power in calibration.

The thresholds, ranges, or both, may be set by the calibration process, and may not change during operation. Alternatively, the calibration process may adjust the threshold, ranges, or both during operation. For example, the portable device 2 may monitor signal strength from the one or more transmitters 10, 12, and adjust a threshold based on changes in signal strength. Put differently, the control unit 40 may dynamically adjust the thresholds or ranges, or both, based on one or more parameters, such as historical strength readings (e.g., RSSI readings). Changes may be implemented periodically during operation or continuously.

In one embodiment, a Bluetooth LE protocol may be used between the portable device 2 and the vehicle 1 to allow communication that enables the portable device 2 to transmit commands and status to the vehicle 1. The low power profile of Bluetooth LE may enable the vehicle control system 100 to provide a connection or link between the portable device 2 in the vehicle 1, while potentially avoiding excessive power drain on the vehicle 1 and the portable device 2.

An agreed-upon protocol including a sequence of messages and events may be established between the portable device 2 and the vehicle 1, such that presence of the portable device 2 inside the vehicle may be confirmed, and the vehicle 2 may be securely started and mobilized. The agreed-upon protocol may include at least one of authentication, authorization, and encrypted communication. For example, messages between the portable device 2 and the vehicle 1 may be encrypted, such that another device listening to Bluetooth LE traffic may be prevented from unauthorized initiation of a vehicle operation. As another example, the agreed-upon protocol may utilize one or more of pre-shared keys, code hopping, and timestamp hashing algorithms. It should be understood that the agreed-upon protocol is not limited to the to the authentication, authorization, and encryption algorithms described herein.

In response to the portable device 2 determining location information related to itself relative to the vehicle 1, the portable device 2 may communicate information to the master transmitter 10 to authorize or initiate, or both, one or more vehicle operations. The communicated information may include a shared secret code that the master transmitter 10 of the vehicle 2 may authenticate to authorize a vehicle operation, such as mobilizing the vehicle 2, or, in other words, starting and enabling the vehicle 2 to be driven.

In an alternative embodiment, the master transmitter 10 may determine location information about the portable device 2 relative to the vehicle 1. The portable device 2 may communicate information to the master transmitter 10 regarding a strength of communication between the portable device 2 and one or more transmitters of the vehicle transmitter system, including, for example, at least one of the master transmitter 10 and one or more of the remote beacons 12. Based on the information communicated from the portable device 2 to the master transmitter 10, the master transmitter 10 may determine a location of the portable device 2 relative to the vehicle 1, such as whether the portable device 2 is in proximity to but exterior to the vehicle 1, or whether the portable device is within the vehicle 1 and in proximity to the vehicle driver seat.

Both the portable device 2 and the vehicle 1 may communicate with an authorization server 3, such as a key server, to obtain a secret code or authorization code. In one embodiment, the authorization server 3 may communicate with the portable device 2 and vehicle 1 via cellular communication, which may be encrypted. The portable device 2, as described above, may include a cellular transceiver 42 that enables the portable device 2 to communicate with the authorization server 3 to obtain a collection of shared secret codes. Likewise, the master transmitter 10 of the vehicle 1 may access a cellular transceiver 28, such as a cellular modem or a telematics unit, of the vehicle system 20 to communicate with the authentication server 3 to obtain the collection of shared secret codes. The collection of shared secret codes may include one or more keys, and may be provided by the authentication server 3 separately or at one time. The collection of the shared secret codes may include a seed for calculating one or more keys.

By providing the same collection of shared secret codes to both the portable device 2 and the vehicle 1, the vehicle control system 100 may provide a degree of security to potentially prevent unauthorized access to one or more vehicle operations, such as unauthorized access to vehicle door locks. For example, after receiving an authorization code from the portable device 2, the master transmitter 10 may compare the received authorization code to one of the shared secret codes received from the authorization server 3. If the received authorization code matches the shared secret code, the master transmitter 10 may successfully authenticate the portable device 2, and authorize mobilization. In one embodiment, to further enhance security and to prevent replay attacks, both the portable device 2 and the master transmitter 10 may be configured to use an authorization code only once. In this context, the collection of shared secret codes received from the authorization server 3 may provide a limited number of authorizations. As a result, the portable device 2 and the master transmitter 10 may communicate with the authorization server 3 to obtain additional shared secret codes. Additionally, or alternatively, the portable device 2 and the master transmitter 10 may use the collection of shared secret codes as a seed to generate additional valid authorization codes.

In one embodiment, the master transmitter 10 and the portable device 2 may utilize asymmetric keys, one public and one private, to securely communicate information, such as an authorization code or a request from the portable device 2 to the master transmitter 10 to authorize or perform a vehicle function. The master transmitter 10 may be provided a private key during manufacture, from the authorization server 3, or the portable device 2, or a combination thereof. To avoid potential compromises in security, such as in case the private key becomes known to or compromised by a potential unauthorized user, the private key may expire or become revoked. The portable device 2 may be responsible for key-management, obtaining public or private keys, or a combination thereof, from the authorization server 3, revoking an existing private key, and providing a private key to the master transmitter 10. A public key obtained from the authorization server 3 and stored in the portable device 2 may allow the portable device 2 to encrypt information communicated to the master transmitter 10. By storing the private key in the master transmitter 10, the master transmitter 10 may be capable of verifying whether the public key provided by the portable device 2 is valid and not expired. By utilizing the portable device 2 for key-management, the master transmitter 10 may not utilize the cellular transceiver 28 to obtain a collection of shared secret codes or a private key.

As described herein, the master transmitter 10 may authorize and initiate a vehicle operation in response to receiving an authorization code from a portable device 2 that matches a stored shared secret code received from an authentication server 3 or generated based on communication from the authentication server 3. In other words, reception of a valid authentication code may enable the master transmitter 10 to authenticate the portable device 2 in terms of presence of the portable device 2 in the vehicle and in terms of authorization from the portable device 2 to start and enable mobilization of the vehicle 1. It should be understood, however, that the vehicle control system 100 is not so limited, and that reception of a valid authorization code may cause any number of operations to occur in the master transmitter 10. For example, the master transmitter 10 may authenticate the portable device 2 based on reception of a valid authorization code, and may wait to initiate one or more vehicle operations until specific instructions to do so are received from the portable device 2.

In one embodiment, the portable device 2 may be configured to notify the user if the portable device 2 is removed from proximity to the vehicle 1, based on monitored signal strength or loss of signal, while the vehicle 1 is running. Additionally, or alternatively, the portable device 2 may notify the user that the vehicle 1 is or has been shut off based on absence of a message or signal transmitted from the vehicle 1.

Figure 3:
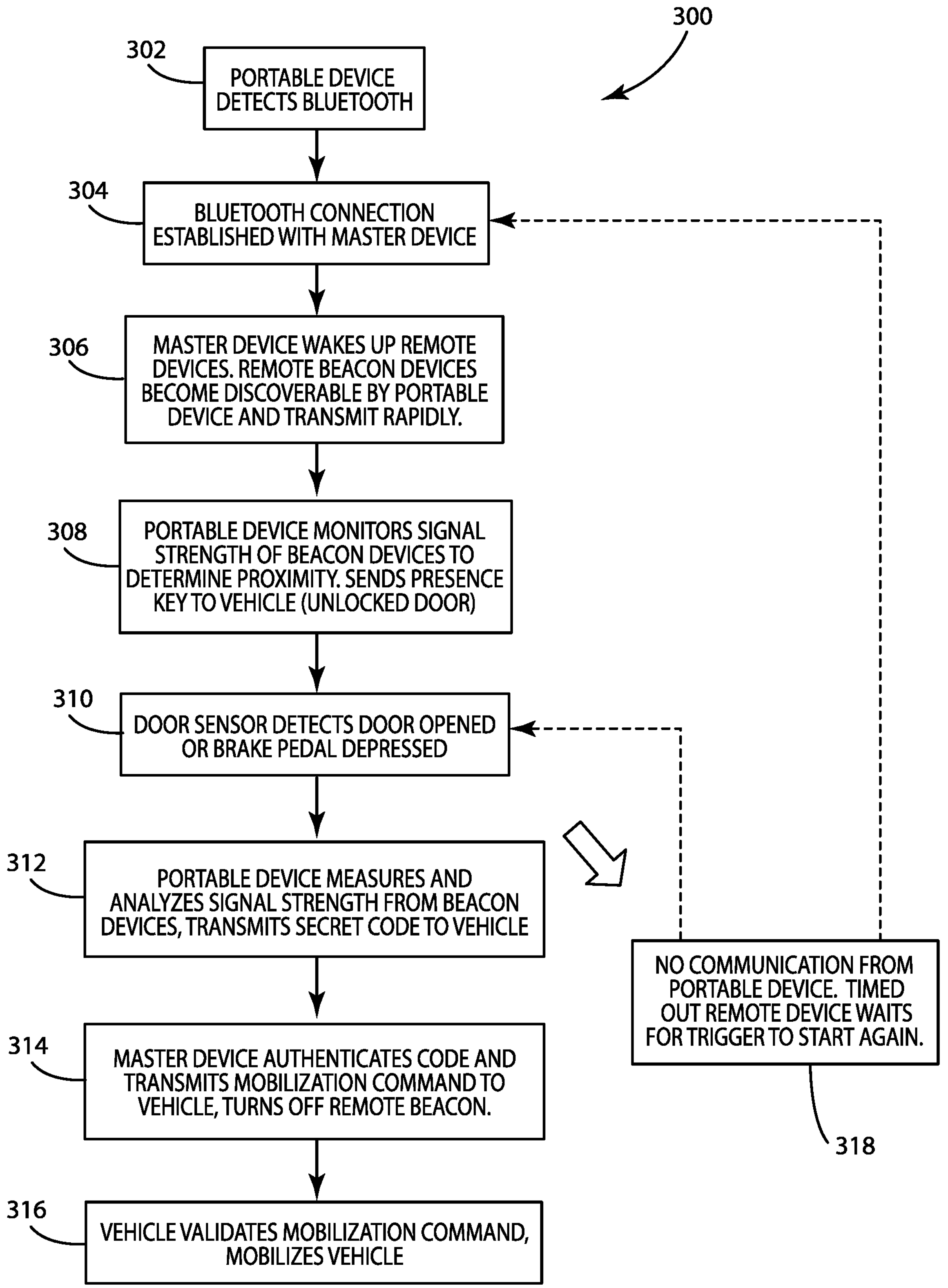
FIG. 3 is a method of authorizing a vehicle operation according to one embodiment.

A method according to one embodiment of the present invention is shown in FIG. 3, and generally designated 300. The process described in connection with the method 300 may be conducted on a vehicle control system configured according to any of the embodiments described herein. For example, the vehicle control system may be similar to the vehicle control system 100 described in connection with the illustrated embodiments of FIGS. 1-2, and may include, for example, a vehicle 1, a portable device 2, and an authorization server 3. For purposes of disclosure, the method 300 is described in connection with a Bluetooth LE communication interface, but it should be understood that any type of communication interface may be used.

The method may include detecting in the portable device 2 an available Bluetooth LE connection to the master transmitter 10 of the vehicle 1. Step 302. After detecting the available Bluetooth LE connection, the portable device 2 may communicate with the master transmitter 10 to negotiate and establish a Bluetooth LE connection. Step 304. Establishment of a Bluetooth LE connection with the portable device 2 may be considered a trigger condition by the master transmitter 10. And, in response to such a trigger condition, the master transmitter 10 may wake one or more beacon transmitter devices 12 via the vehicle transmitter communication interface 30 such that the one or more beacon transmitter devices 12 become discoverable by the portable device 2, and rapidly transmit signals capable of being monitored by the portable device 2. Step 306. For example, the transmission rate may be about 30 times per second. The portable device 2 may monitor a strength of a signal received from each of the one or more beacon transmitter devices 12. Based on the monitored strength of each signal, the control unit 40 of the portable device 2 may determine location information regarding the portable device 2 relative to the vehicle 1. For example, the control unit 40 may compare the monitored strength of each signal relative to one another to determine location information, such as whether the portable device 2 is located within or exterior to the vehicle 1. Based on the determined location information, the portable device 2 may communicate an authorization key or code to the master transmitter 10 of the vehicle 1. Step 308. For example, if the control unit 40 determines the portable device 1 is located exterior to the vehicle 1, the control unit 40 may communicate via the Bluetooth LE interface 44 an authorization key to authorize unlocking of a vehicle door. After receiving such an authorization key, the master transmitter 10 may compare the authorization key against a stored key to determine whether the authorization key is valid to unlock a door. If the authorization key is valid, the master transmitter 10 may communicate with the vehicle system 20 to authorize and initiate unlocking of the vehicle door. The master transmitter 10, at this stage, may direct the one or more beacon transmitter devices 12 to discontinue transmission of signals in order to conserve power.

In one embodiment, the master transmitter 10 may monitor the vehicle bus 32 for the occurrence of one or more operating conditions of the vehicle 1, such as if a door has been opened, or if a brake pedal has been depressed. Step 310. In response to the occurrence of one or more operating conditions (e.g., a trigger condition), the master transmitter 10 may instruct the one or more beacon transmitter devices 12 to become discoverable and to transmit signals rapidly to the portable device 2. If the master transmitter 10 does not receive communication from a portable device 2 within a predetermined time period, the master transmitter 10 may instruct the one or more beacon transmitter devices 12 to discontinue transmitting signals, and may wait for another trigger condition, such as occurrence of one or more operating conditions of vehicle 2 or establishment of a Bluetooth LE connection with a portable device 2, or both, before waking the one or more beacon transmitter devices 12.

Based on reception of signals from the beacon transmitter devices 12, the control unit 40 of the portable device 2 may determine location information regarding the portable device 2 relative to the vehicle 1. Step 312. The determination in step 312 may be similar to the process described in step 308. Based on the determined location information being indicative that the portable device 2 is within the vehicle 1, the control unit 40 may transmit an authorization code to the master transmitter 10, authorizing the master transmitter to start and mobilize the vehicle 1. The authorization code may be similar to the authorization code described above to authorize a vehicle operation, such as unlocking the door. For example, the master transmitter 10 may compare the authorization code against a stored authorization code or key to determine whether the authorization code received by the portable device 2 is valid to initiate starting or mobilization of the vehicle 1. If the authorization code received by the portable device 2 is valid, the master transmitter 10 may instruct the vehicle system 20, via the vehicle bus 32, to mobilize and start the vehicle 1. After a valid authorization code is received by the master transmitter 10, the master transmitter 10 may direct the one or more beacon transmitter devices 12 to discontinue transmission of signals. Step 314. The vehicle system 20 may validate that the mobilization command received from the master transmitter 10 is in fact a valid command, and if so, may start and mobilize the vehicle 1. Alternatively, the master transmitter 10 may authorize the vehicle system 20 to mobilize, and the vehicle system 20 may wait until at least one of a start button and a brake pedal are activated to start the vehicle.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes may be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiment of the invention in which an exclusive property or priviledge is claimed are defined as follows:

1. A system for determining a location of a portable device relative to a vehicle, said system comprising:

a system device configured to determine the location of the portable device relative to the vehicle;

a first transceiver and a second transceiver disposed on the vehicle, the first transceiver configured for first wireless communications with the portable device at a frequency of 2 GHz or greater, the second transceiver configured for second wireless communications with the portable device at a frequency of 2 GHz or greater;

a control unit operable to determine, based on a first sensed characteristic of the first wireless communications with the portable device at a frequency of 2 GHz or greater, first information indicative of a location of the portable device relative to the first transceiver, wherein the first wireless communications from which the first information indicative of location is determined are communicated according to a variable transmission rate;

the control unit operable to obtain, via the second wireless communications with the portable device at a frequency of 2 GHz or greater, second information pertaining to an authorization of the portable device relative to the vehicle, wherein the second wireless communications from which the second information pertaining to the authorization is obtained are communicated according to a transmission rate that is different from the first communications;

wherein the system device determines the location of the portable device based on the first information determined by the control unit, whereby the location of the portable device is based on the first sensed characteristic of the first wireless communications at the frequency of 2 GHz or greater;

wherein authorization of the portable device relative to the vehicle is determined based on the second information obtained via the second wireless communications; and wherein the first wireless communications are transmitted at a first transmission rate, wherein the second wireless communications are transmitted at a second transmission rate, wherein the first transmission rate is different from the second transmission rate.

2. The system of claim 1 wherein the system device is a vehicle device.

3. The system of claim 1 wherein the control unit is disposed in the portable device.

4. The system of claim 3 wherein the second information is transmitted from the second transceiver to the portable device.

5. The system of claim 1 wherein the system device is configured to repeatedly determine the location of the portable device at a location update rate that defines an interval between successive determinations of the location of the portable device, wherein the system device determines the location of the portable device based on the first information.

6. The system of claim 5 wherein the location update rate is increased based on the portable device becoming closer to the vehicle such that the interval between successive determinations of the location of the portable device is decreased, whereby, as the portable devices becomes closer to the vehicle, the location of the portable device is determined and updated more frequently.

7. The system of claim 1 comprising:

an authorization server that is separate from the portable device and the vehicle, the authorization server configured to communicate with at least one of the portable device and the vehicle; and wherein the authorization server configured to provide authorization server information to the at least one of the portable device and the vehicle.

8. The system of claim 7 wherein the authorization server information includes secret information that forms the basis for the second information communicated via the second wireless communications with the portable device at a frequency of 2 GHz or greater.

9. The system of claim 1 comprising a first device disposed on the vehicle and a second device disposed on the vehicle at a position different from the first device, wherein the first device includes the first transceiver and the second device includes the second transceiver.

10. The system of claim 1 wherein the system device determines authorization of the portable device based on the second information.

11. The system of claim 1 wherein the first and second transceivers are not the same transceiver.

12. The system of claim 1 wherein the first wireless communications and the second wireless communications are transmitted according to a common radio protocol.

13. A method for determining a location of a portable device relative to a vehicle, said method comprising:

a system device configured to determine the location of the portable device relative to the vehicle;

wirelessly communicating, at a first transmission rate that is variable, first communications with the portable device at a frequency of 2 GHz or greater, wirelessly communicating, at a second transmission rate, second communications with the portable device at a frequency of 2 GHz or greater, wherein the first transmission rate is different from the second transmission rate;

determining, based on a first sensed characteristic of the first communications with the portable device at a frequency of 2 GHz or greater according to a first transmission rate that is variable, first information indicative of a location of the portable device relative to the first transceiver;

obtaining, via the second communications with the portable device at a frequency of 2 GHz or greater according to a second transmission rate that is different from the first transmission rate that is variable, second information pertaining to at least one of authorization and authentication of the portable device relative to the vehicle;

determining the location of the portable device based on the first information, whereby the location of the portable device is based on the first sensed characteristic of the first communications at the frequency of 2 GHz or greater; and determining at least one of authorization and authentication of the portable device relative to the vehicle based on the second information obtained via the second communications.

14. The method of claim 13 comprising transmitting the second information from the vehicle to the portable device.

15. The method of claim 13 comprising repeatedly determining the location of the portable device at a location update rate that defines an interval between successive determinations of the location of the portable device.

16. The method of claim 15 the location update rate is increased based on the portable device becoming closer to the vehicle such that the interval between successive determinations of the location of the portable device is decreased, whereby, as the portable devices becomes closer to the vehicle, the location of the portable device is determined and updated more frequently.

17. The method of claim 13 wherein the first communications and the second communications are transmitted according to the same a common radio protocol.

18. The method of claim 13 wherein the first communications and the second communications are transmitted from different transceivers.

19. The method of claim 13 wherein the first communications are transmitted from a first transceiver disposed on the vehicle.

20. The method of claim 13 wherein the second communications are transmitted from a second transceiver disposed on the vehicle.

* * * * *